(12) United States Patent
Di Palma et al.

(10) Patent No.: US 8,794,500 B2
(45) Date of Patent: Aug. 5, 2014

(54) ARRANGEMENT WITH A METAL PIPE AND A CONNECTING ELEMENT, AS WELL AS METHOD OF MOUNTING THE CONNECTING ELEMENT

(71) Applicant: Nexans, Paris (FR)

(72) Inventors: Michele Di Palma, Springe (DE); Stephan Lange, Wedemark (DE); Klaus Schippl, Hannover (DE); Christian Frohne, Hannover (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 13/845,888

(22) Filed: Mar. 18, 2013

(65) Prior Publication Data

US 2014/0115859 A1    May 1, 2014

Related U.S. Application Data

(62) Division of application No. 13/405,448, filed on Feb. 27, 2012.

(30) Foreign Application Priority Data

Apr. 11, 2011    (EP) ................................. 11305422

(51) Int. Cl.
*B23K 31/02* (2006.01)
(52) U.S. Cl.
USPC ............................ 228/140; 228/170; 228/174
(58) Field of Classification Search
None
See application file for complete search history.

(56) References Cited

U.S. PATENT DOCUMENTS

| | | | |
|---|---|---|---|
| 3,757,280 A * | 9/1973 | Staschewski | 439/583 |
| 4,089,351 A * | 5/1978 | Ward et al. | 138/109 |
| 4,134,606 A * | 1/1979 | Menti, Jr. | 285/21.1 |
| 5,137,470 A * | 8/1992 | Doles | 439/578 |
| 5,441,312 A * | 8/1995 | Fujiyoshi et al. | 285/23 |
| 5,738,385 A * | 4/1998 | Homann et al. | 285/226 |
| 5,799,989 A * | 9/1998 | Albino | 285/334.5 |
| 5,944,362 A * | 8/1999 | Harle | 285/148.14 |
| 6,173,995 B1 * | 1/2001 | Mau | 285/55 |
| 6,199,918 B1 * | 3/2001 | Gerich | 285/308 |
| 6,502,866 B1 * | 1/2003 | Hujisawa et al. | 285/249 |
| 6,764,107 B1 * | 7/2004 | Obahi et al. | 285/322 |
| 6,860,518 B2 * | 3/2005 | Krauss et al. | 285/206 |
| 7,328,920 B2 * | 2/2008 | Schneider et al. | 285/256 |
| 8,276,947 B2 * | 10/2012 | Smahl | 285/294.1 |
| 2002/0117226 A1 * | 8/2002 | Malcarne, Jr. | 138/121 |
| 2002/0145284 A1 * | 10/2002 | Powell | 285/353 |
| 2004/0066037 A1 * | 4/2004 | Schneider et al. | 285/256 |
| 2004/0094953 A1 * | 5/2004 | Luft et al. | 285/256 |
| 2004/0212191 A1 * | 10/2004 | Segal et al. | 285/334.5 |
| 2005/0023832 A1 * | 2/2005 | Edler | 285/354 |
| 2005/0099005 A1 * | 5/2005 | Fullbeck et al. | 285/256 |
| 2005/0229990 A1 * | 10/2005 | Hilgert | 138/121 |
| 2006/0006651 A1 * | 1/2006 | Watanabe | 285/903 |

(Continued)

*Primary Examiner* — Kiley Stoner
(74) *Attorney, Agent, or Firm* — Sofer & Haroun, LLP

(57) ABSTRACT

An arrangement is provided for a helically undulated pipe made of metal, which has an end face extending along a turn of the thread of its undulation and a connecting element to be fastened to the pipe. The connecting element includes a pipe piece which has a helically extending inner surface corresponding to the turn of the thread of the undulation of the pipe. The pipe piece is mounted on the pipe in the undulation of the pipe. A metal ring is arranged on the pipe piece, where the pipe piece has sections with different inner diameters arranged one behind the other in the axial direction.

1 Claim, 2 Drawing Sheets

(56) References Cited

U.S. PATENT DOCUMENTS

| | | | |
|---|---|---|---|
| 2006/0061093 A1* | 3/2006 | Freudinger | 285/242 |
| 2008/0012309 A1* | 1/2008 | Blivet et al. | 285/288.1 |
| 2008/0036207 A1* | 2/2008 | Choi | 285/323 |
| 2008/0217917 A1* | 9/2008 | Chiu | 285/354 |
| 2010/0201124 A1* | 8/2010 | Duquette et al. | 285/382.7 |
| 2011/0068571 A1* | 3/2011 | Choi | 285/235 |
| 2012/0153611 A1* | 6/2012 | Paima et al. | 285/81 |
| 2013/0300110 A1* | 11/2013 | Ivett | 285/332.1 |

* cited by examiner

ARRANGEMENT WITH A METAL PIPE AND A CONNECTING ELEMENT, AS WELL AS METHOD OF MOUNTING THE CONNECTING ELEMENT

RELATED APPLICATION

This application is a divisional application of U.S. patent application Ser. No. 13/405,448, filed on Feb. 27, 2012, which in turn claims the benefit of priority from European Patent Application No. 11 305 422.5, filed on Apr. 11, 2011, the entirety of which are incorporated by reference.

BACKGROUND

1. Field of the Invention

The invention relates to an arrangement with a helically undulated pipe of metal which has an end face extending along a turn of the thread of its undulation, and a connecting element to be fastened to the undulation, wherein the connecting piece includes a pipe piece of metal, which has a helically extending inner surface corresponding to the thread of the undulation of the pipe, and a smooth cylindrical outer surface and, in the mounted position, is arranged on the pipe, with engagement into the undulation of the pipe, as well as a method for mounting the connecting element (DE-C-21 26 871).

2. Description of the Related Art

Pipes of metal which are undulated transversely of their longitudinal direction have been known for a long time. They are used, for example, as electrical conductors of high frequency cables, as sheathings for electrical and optical cables, in cryostats for superconductive cables, or for transporting liquid or gaseous media. Because of the wave-shaped configuration of the wall of the pipe, special connections are required for the further connection of the pipe. In pipes having ring-shaped undulations, such connections are still of relatively simple construction. It is more difficult in pipes having helically-shaped undulations because, in a radial section through such a pipe, additionally an end face is created which is located eccentrically relative to the center axis of the pipe, and which may not be round.

In the known connecting element, according to the above mentioned DE-C-21 26 871, a holding ring is screwed onto the end of a helically undulated pipe, wherein the holding ring has a helically-shaped inner surface and a cylindrical outer surface. The holding ring rests in the mounted position against a radially outwardly bent beaded edge which extends along a turn of the thread.

For this purpose, the holding ring has an end face corresponding to the course of the beaded edge and extending along a turn of the thread. In the mounted position a sleeve-like fitting is placed on the holding ring, wherein the fitting has in its interior a contact surface corresponding to the course of the beaded edge, and which, in the mounted position, rests against the beaded edge. This connecting element is in its totality cumbersome and not suitable for a stable connection of further structural components.

OBJECTS AND SUMMARY

The invention is based on the object of constructing the above-described connecting element, such that it can be mounted with a stable fixed seat on a helically undulated pipe.

In accordance with the invention, this object is met in that in the mounted position, a metal ring is arranged on the pipe piece while contacting the pipe piece, and is welded with the pipe piece whose inner surface includes two sections with different inner diameters arranged axially one behind the other, the ring rests with its section having the greater inner diameter on the pipe piece, and rests with its section having the smaller inner diameter, on the pipe on the side of the pipe piece facing the end face of the pipe, the section of the ring having the smaller inner diameter has an end face corresponding to the course of the turn of the thread of the pipe and extending along a helical line, the ring is at its helically extending end face welded to the end face of the pipe.

In accordance with the invention, for example, the following method steps are carried out:

a) After one revolution the pipe is severed at one end along a turn of the thread, with a section in the axial direction connecting the beginning and the end of the turn of the thread;

b) Screwed onto the pipe is a pipe piece of metal, which has a helically extending inner surface and a smooth cylindrical outer surface;

c) A metal ring, having two sections with inner diameters, is slid onto the pipe piece with its section having the greater diameter which rests with its section having the smaller diameter on the pipe, and which has, in this section, an end face corresponding to the turn of the thread of the pipe and extending along a helical line;

d) The ring is welded to the end face of the pipe at its helically extending end face;

e) The ring is welded to the pipe piece.

The pipe piece and the ring of this connecting element are located outside of the undulated pipe so that its inner cross section is not restricted by the two parts. Since the ring is welded to the undulated pipe, as well as to the pipe piece, a mechanically stable connecting element which is fixedly connected to the connecting element is obtained. When the pipe piece, after welding the ring to the pipe, is rotated or pushed with the pipe in the direction of the end of the undulated pipe, the side of the thread is pressed at its inner surface against the wall of the corresponding undulation of the pipe. When the ring and the pipe piece are then welded together, the fixed seat of ring and pipe piece on the pipe is further improved.

BRIEF DESCRIPTION OF THE DRAWINGS

An embodiment of the subject matter of the invention is illustrated in the drawings.

In the drawing.

DETAILED DESCRIPTION

Figure 1:
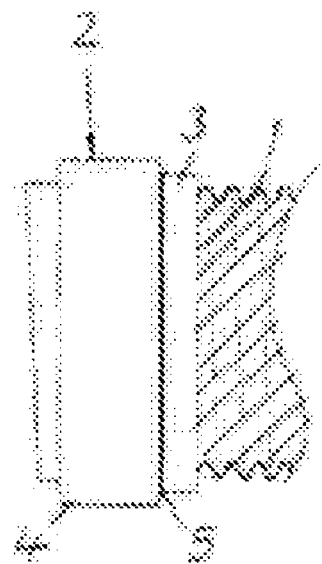
FIG. 1 shows in a schematic illustration a connecting element according to the invention mounted at an end of a helically undulated metal pipe.
Figure 2:
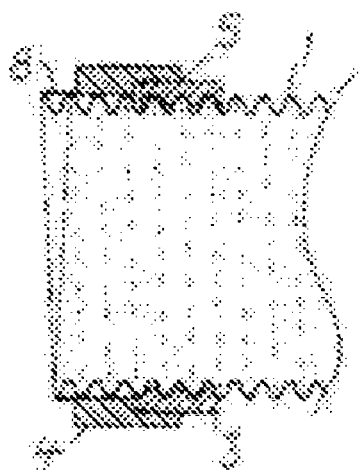
FIG. 2 is a cross sectional view through FIG. 1.

FIG. 1 shows the end of a pipe 1 which is provided with an undulation which extends transversely of its axis along a helical line. The pipe 1 advantageously is of steel, particularly high-grade steel, or of copper. A connecting element 2 is fastened to the pipe 1, wherein the connecting element 2 serves for connecting further components.

The connecting element 2 is also of metal, particularly high-grade steel. It has a pipe piece 3 provided with an inner thread and a smooth cylindrical outer surface, and a ring 4. In the assembled position, pipe piece 3 and ring 4 are circumferentially welded together at location 5. The inner thread of the pipe piece 3 corresponds to the helically shaped course of the undulation of the pipe 1. The ring 4 is stepped in its interior. As a result, in accordance with the illustrations in FIG. 4, a section 6 with a greater inner diameter and a section 7 with a smaller inner diameter are formed. The inner diameter of the section 6 corresponds to the outer diameter of the pipe piece 3, while the inner diameter of the section 7 corresponds to the outer diameter of the pipe 1.

The ring 4 advantageously has at its end, on the side of section 7, a projection 8 with a wall thickness which is significantly smaller as compared to its other dimensions, but with the same inner diameter as the section 7. The end face of the projection 8 extends congruent with the end face of the pipe 1 along a helical line. In the assembled position, pipe 1 and ring 4 are welded together at their end faces by means of a circumferential welding seam 9.

Figure 3:
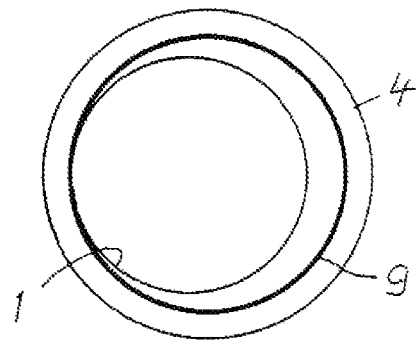
FIG. 3 shows a top view of the end face of the connecting element.

For mounting the connecting element 2 on an undulated pipe 1, initially the pipe piece 3 is screwed onto the pipe 1 up to a predetermined position. Subsequently, the ring 4 is slid onto the pipe 1 and the pipe piece 3, to such an extent that the end face of its projection 8 is in alignment with the end face of the pipe 1. Pipe 1 and ring 4 are then welded together at their end faces along the we seam 9 (FIG. 3). The pipe piece 3 is then turned back or pushed back in the direction of the end of pipe 1 as needed, until it rests against the step formed in the ring as a result of the stepped configuration of the ring 4. As a result, the side of the thread at the inner side of the pipe piece 3 is also pressed against the wall of the corresponding undulation of the pipe 1. Finally, ring 4 and pipe piece 3 are welded together at location 5.

Figure 4:
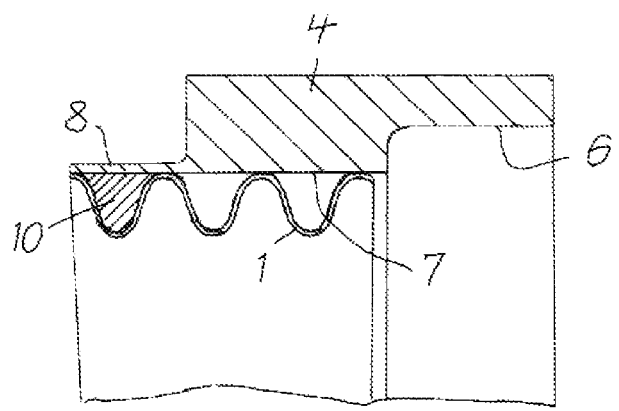
FIG. 4 shows a detail of the connecting element on a larger scale.

Due to the axially extending cut made when producing the end face, the wave valley adjacent the helically extending end face of the pipe 1 is open. For sealing the pipe 1 relative to its surroundings, a filling body 10 can advantageously be placed in this wave valley as shown in FIG. 4, and can be fixedly connected to the pipe 1 and the ring 4, for example, welded together. This closes the opening between pipe 1 and ring 4. In FIG. 4, only the ring 4 and a section of the pipe 1 are shown on a larger scale. The filling body 10 extends preferably about approximately 360°. It may be constructed as a prefabricated fitted piece of high-grade steel which only has to be placed in the wave valley.

The invention claimed is:

1. Method of mounting a connecting element at an end of a helically corrugated pipe of metal where said helically corrugated pipe of metal has an end face extending along a helical turn of a helical thread formed from its corrugation and where said connecting element to be fastened to the pipe includes a pipe piece of metal which has a helically extending inner surface corresponding to the helical thread of the corrugation of the pipe, and a smooth cylindrical outer surface, said method comprising the steps of:

initially severing the pipe at an end along a screw thread with a cut in axial direction of the pipe connecting a beginning and an end of the helical thread after one revolution;

a pipe piece of metal, which is provided with a helically extending inner surface and has a non-corrugated cylindrical outer surface, is subsequently screwed onto the pipe;

subsequently a metal ring, which has two sections with different inner diameters, is pushed onto the pipe piece with a section of said metal ring having the greater diameter, which rests with its section having the smaller diameter on the pipe, and has on this section an end face corresponding to said helical turn of the thread of the pipe and extending along a helical line;

the ring is then welded at its helically extending end face to the end face of the pipe; and that the ring is finally welded to the pipe piece.

* * * * *